US000001470H

United States Statutory Invention Registration [19]

[11] Reg. Number: H1470

[43] Published: Aug. 1, 1995

Ewing et al.

[54] REFRACTIVE INDEX-BASED SENSOR FOR THE DISCRIMINATION OF CHLORINATED HYDROCARBONS FROM GROUNDWATER

[76] Inventors: Kenneth J. Ewing, 13011 Victoria Hgts. Dr., Bowie, Md. 20715; Gregory Nau, 819 Church St., Alexandria, Va. 22314; Thomas Bilodeau, 408 Timber Branch Pkwy., Alexandria, Va. 22302; Irwin Schneider, 2402 Daphne La., Alexandria, Va. 22306; Ishwar Aggarwal, 9810 View Crest Dr., Fairfax Station, Va. 22039

[21] Appl. No.: 219,188

[22] Filed: Mar. 28, 1994

[51] Int. Cl.[6] ..... G01N 21/41

[52] U.S. Cl. ..... 356/128; 356/135

[58] Field of Search ..... 356/128–137

[56] References Cited

U.S. PATENT DOCUMENTS

| | | | |
|---|---|---|---|
| 4,451,147 | 5/1984 | Dobes et al. | 356/135 |
| 4,571,075 | 2/1986 | Kamrat | 356/136 |
| 4,704,029 | 11/1987 | Van Heuvelen | 356/136 |
| 4,844,608 | 7/1989 | Smith | 356/136 |
| 4,979,797 | 12/1990 | Nemeth | 350/96.29 |
| 4,981,338 | 1/1991 | Bobb et al. | 350/96.29 |

FOREIGN PATENT DOCUMENTS

| | | | |
|---|---|---|---|
| 0145550 | 6/1989 | Japan | 356/136 |

*Primary Examiner*—Bernarr E. Gregory

[57] ABSTRACT

A refractive index-based sensor uses a light source and an optical fiber to direct an optical beam towards a sensor/environment face at a specific angle. The sensor has a predetermined shape selected such that the light directed into the sensor will have a specific angle of incidence designed to detect a plurality of liquids. A second optical fiber carries the light reflected off the sensor/environment face to a photodetector. The optical beam will either be transmitted through or reflected off the sensor/environment face based upon the refractive indices of the sensor and the environment and upon the angle of incidence of the optical beam. The amount of light reflected is indicative of the refractive index of the material in a given area of the sensor/environment face and, thus, the type of material. By adjusting the angle at which the light is directed to the sensor/environment face, the photodetector response can be calibrated to identify the type of liquid present at the sensor/environment face.

8 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REFRACTIVE INDEX-BASED SENSOR FOR THE DISCRIMINATION OF CHLORINATED HYDROCARBONS FROM GROUNDWATER

BACKGROUND OF THE INVENTION

1. Field of the Invention

This invention relates to optical sensors designed to detect liquid pools within the soil. More specifically, this invention relates to an apparatus designed to detect and discriminate between liquid pools of dense non-aqueous phase liquids (DNAPL) such as chloroform, trichloroethylene (TCE), and carbon tetrachloride and ground water or soil gases.

2. Description of the Related Art

Currently, numerous governmental agencies and private organizations are involved in massive programs designed to identify, characterize, and remediate various hazardous waste sites around the country. A major problem at many sites is the contamination of the soil by dense non-aqueous phase liquids (DNAPL) such as chloroform, trichloroethylene (TCE), and carbon tetrachloride. These materials, which may have been dumped into settling ponds or may have leaked from buried containers, slowly sink into the soil and, at some point, reach an impermeable layer such as a clay barrier. Over time, these materials collect in a layer or pool over the barrier. Additionally, many of these materials vaporize and contaminate the soil above the pool. Therefore, many of the materials in the soil can exist in two distinct phases, liquid and gas.

A sensor which is able to locate liquid pools of DNAPL such as TCE and identify the type of liquid would be very useful for environmental applications. For example, such a sensor could be used to locate and identify underground pools such that a three dimensional diagram of the contaminated area can be created. These diagrams are useful in identifying the contaminated area and creating and implementing a comprehensive clean-up plan.

Currently, liquid pools of hazardous materials are located by drilling of one or more test wells to obtain samples which are then analyzed. However, this method has several limitations. Because the test wells often must be several hundred feet deep, this process takes time and is quite expensive. Additionally, because the materials can exist in two distinct phases, the samples often contain soil that has been contaminated by vapors. This creates a problem of having to treat the samples before they can be disposed. Furthermore, a three dimensional map of the contaminated area cannot be obtained with this method.

While several fiber optic sensors and optical probes have been developed to detect liquid levels as well as determine the type of material present, such conventional probes suffer from one or more disadvantages. For example, sensors which identify liquid levels do not accurately identify the type of liquid present. Sensors which do identify the type of material present generally require that the fiber be in contact with the material.

This requirement limits the usefulness of the sensor for environmental applications such as the detection of liquids within the soil because the fibers are too fragile to be repeatedly driven into the soil. Additionally, many sensors which identify the type of material do not differentiate between the liquid and gas phase of the material. Furthermore, many of these sensors require expensive equipment and/or a relatively high degree of skill to operate.

SUMMARY OF THE INVENTION

Accordingly, it is an object of this invention to provide an optical sensor for the detection of liquid pools of dense non-aqueous phase liquids within the soil.

Another object of the present invention is to provide an optical-based liquid material sensing apparatus that accurately detects as well as differentiates between types of specific liquid materials.

Another object of the present invention is the provision of a liquid material sensing apparatus capable of accurately detecting as well as differentiating between specific liquid materials without requiring relatively expensive, sizeable, cumbersome and/or fragile equipment.

A further object of the present invention is the provision of a liquid material sensing system capable of accurately detecting specific liquid materials within the soil as well as differentiating between certain materials which does not require a relatively high degree of skill to operate.

In accordance with these and other objects made apparent hereinafter, the invention concerns an apparatus for the detection and discrimination of specific liquid materials. The apparatus uses a light source and an optical fiber to direct an optical beam towards a sensor-/environment interface or face at a specific angle. A second optical fiber carries the light reflected off the interface to a photodetector. By adjusting the angle at which the light is directed to the interface, the photodetector response can be calibrated to identify the type of liquid present at the interface.

BRIEF DESCRIPTION OF THE DRAWINGS

These and other objects, features and advantages of the invention will become better understood by reference to the following detailed description when considered in connection with the accompanying drawings wherein like reference numerals designate identical or corresponding parts throughout the several views and wherein.

DETAILED DESCRIPTION

Figure 1:
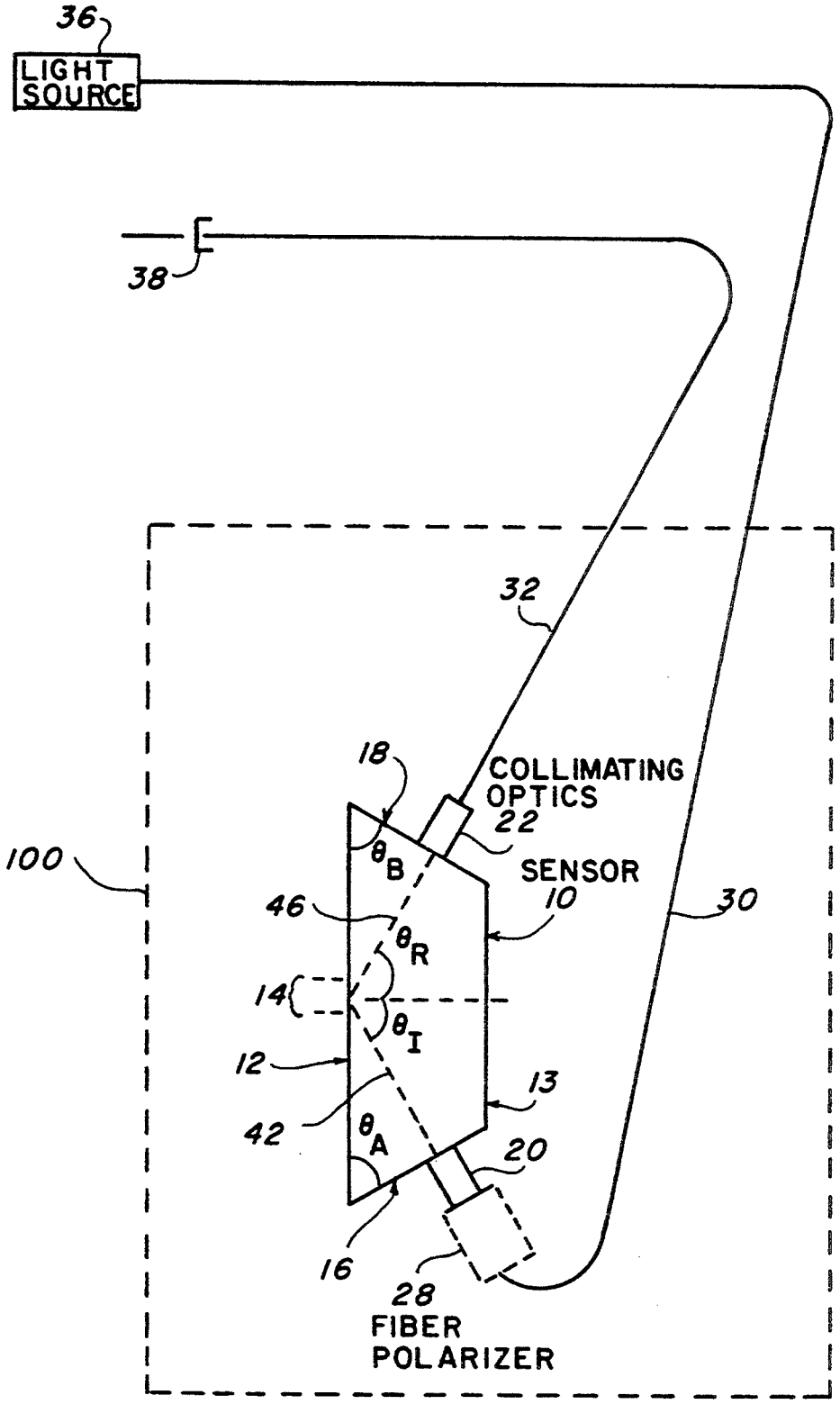
FIG. 1 is a diagram illustrating a first embodiment of the present invention.

Referring now to FIG. 1, there is shown a first embodiment of a fiber optic refractive index-based sensor of the present invention. Light from a source 36, such as a halogen lamp, an LED, or a laser, is transmitted through a length of optical fiber 30, through collimating optics 20 and into a sensor 10. The sensor 10 is arranged in a truncated triangular-shaped configuration having parallel faces 12 and 13. Collimating optics 20 produces a collimated beam 42 which enters sensor 10 through surface 16. Collimating optics 20 is used to concentrate the light entering sensor 10 into a narrow collimated beam 42, which strikes face 12 at area 14. Preferably, collimating optics 20 is affixed by an optical adhesive directly to surface 16 of sensor 10 such that collimated beam 42 is substantially orthogonal to surface 16 as the beam 42 enters the sensor 10. Mounting collimating optics 20 in the manner just described reduces the amount of light reflected at surface 16 thereby maximizing the amount of light entering sensor 10. The collimation of the light from optical fiber 30 can be accomplished by any of several conventional means including, but not limited to, a graded index lens, a mirror, or a lens and mirror combination.

Optionally, a fiber polarizer 28 can be arranged between source 36 and collimating optics 22. Preferably, fiber polarizer 28 is disposed between fiber 30 and collimating optics 20 such that the distal end of fiber 30 is directly butt-coupled to the input end of fiber polarizer 28, while the output end of fiber polarizer 28 is directly butt-coupled to collimating optics 20 (as shown in FIG. 1). Fiber polarizer 28 is used to polarize the light such that beam 42 has an electric field component which is essentially parallel to, or perpendicular to, the plane of incidence at face 12. However, fiber polarizer 28 is designated by a dashed line in FIG. 1 because the polarizer is an optional element of the present invention and can be omitted if a desired application does not require its use.

Collection optics 22, which is affixed to surface 18 of sensor 10, is used to efficiently collect beam 46 (the portion of collimated beam 42 which has been internally reflected within sensor 10) and couple the light to fiber 32. The light coupled to fiber 32 is directed onto photodetector 38 which creates an electronic output proportional to the intensity of the light received. To efficiently collect beam 46 as the beam exits sensor 10, one end of collection optics 22 should be directly coupled to surface 18 of sensor 10, while the other end of collection optics 22 should be directly coupled to fiber 32. Preferably, collection optics 22 is a graded index lens; however, the collection of beam 46 can be accomplished by any of several conventional means including, but not limited to, a conventional lens, mirrors, or a lens and mirror combination.

The amount of light reflected within sensor 10 depends upon the refractive indices of sensor 10 and the material present at face 12 (the sensor/environment interface) as well as the angle of incidence of the light with respect to a line perpendicular to face 12 (angle $\Theta_I$). As $\Theta_I$ increases, the amount of light reflected at the window/environment interface or face 12 will rapidly increase when $\Theta_I$ equals the critical angle. The critical angle for the window/environment interface is related to the refractive indices by:

$$\sin(\Theta)=n_2/n_1 \quad (1)$$

where $n_1$ is the index of refraction of sensor 10 and $n_2$ is the index of refraction of the material present at area 14 of face 12.

For light to be internally reflected, it is evident from equation 1 that the refractive index $n_1$ of sensor 10 must be greater than the refractive index $n_2$ of the material present at face 12. It is also evident from equation 1 that, as the refractive index of the material at face 12 increases, the critical angle also increases. This increase in the critical angle for materials with different greater refractive indices $n_2$makes the design of a sensor for specific materials possible. By setting angle $\Theta_1$ at a specific angle, a sensor can be designed in which light will be internally reflected within sensor 10 for materials with a low index $n_2$ (e.g. soil gases, water) while light will not be internally reflected within sensor 10 for materials with a high index $n_2$ (e.g. carbon tetrachloride, TCE). This is accomplished by adjusting the shape of the sensor 10 so that the angles $\Theta_A$ and $\Theta_B$ are set such that the collimated beam 42 strikes the face 12 at a specific angle to detect the material or materials desired to be sensed.

To be more precise, the shape of sensor 10 must be considered. Let angle $\Theta_A$ represent the angle between surface 16 and face 12 of sensor 10 and angle $\Theta_B$ represent the angle between surface 18 and face 12 of sensor 10. If collimating optics 20 is affixed to surface 16 of sensor 10 such that collimated beam 42 is orthogonal to surface 16 as the beam enters the sensor 10, the angle of incidence of beam 42 with face 12 (angle $\Theta_I$) will be equal to angle $\Theta_A$. Beam 46 will be reflected from face 12 at an angle $\Theta_R$ equal to angle $\Theta_I$. For $\Theta_B=\Theta_A$, beam 46 will be orthogonal to surface 18 as it exits sensor 10. Additionally, if collimating optics 20 is affixed to surface 16 such that beam 42 strikes face 12 midway between surfaces 16 and 18, collection optics 22 will be affixed to surface 18 such that collection optics 22 is diametrically opposed to collimating optics 20.

In operation, light from source 36 propagates through fiber 30 into collimating optics 20 and then enters sensor 10 at a preset angle of incidence $\Theta_I$. The light entering sensor 10 will be internally reflected so long as the refractive index $n_2$ of the material at face 12 of sensor 10 is such that the angle of incidence $\Theta_I$ is greater than or equal to the critical angle for that sensor/environment interface. This internally reflected light is then collected by collection optics 22 and carried by fiber 32 to photodetector 38. However, when the refractive index $n_2$ of the material at face 12 of sensor 10 is such that the angle of incidence $\Theta_I$ is less than the critical angle for the sensor/environment interface, less of the light entering sensor 10 is internally reflected off face 12. Because less light is internally reflected, fiber 32 directs less light onto photodetector 38 resulting in a corresponding change in the output of photodetector 38. The variations in the amount or intensity of the light internally reflected within sensor 10, which are obtained by monitoring the output of photodetector 38, can be used to determine when a specific liquid is in contact with face 12 as well as to differentiate between type of liquid present at face 12. The relationship of the output of photodetector 38 to angle $\Theta_I$ for materials with various indices of refraction is explained below with reference to FIG. 2.

Figure 2:
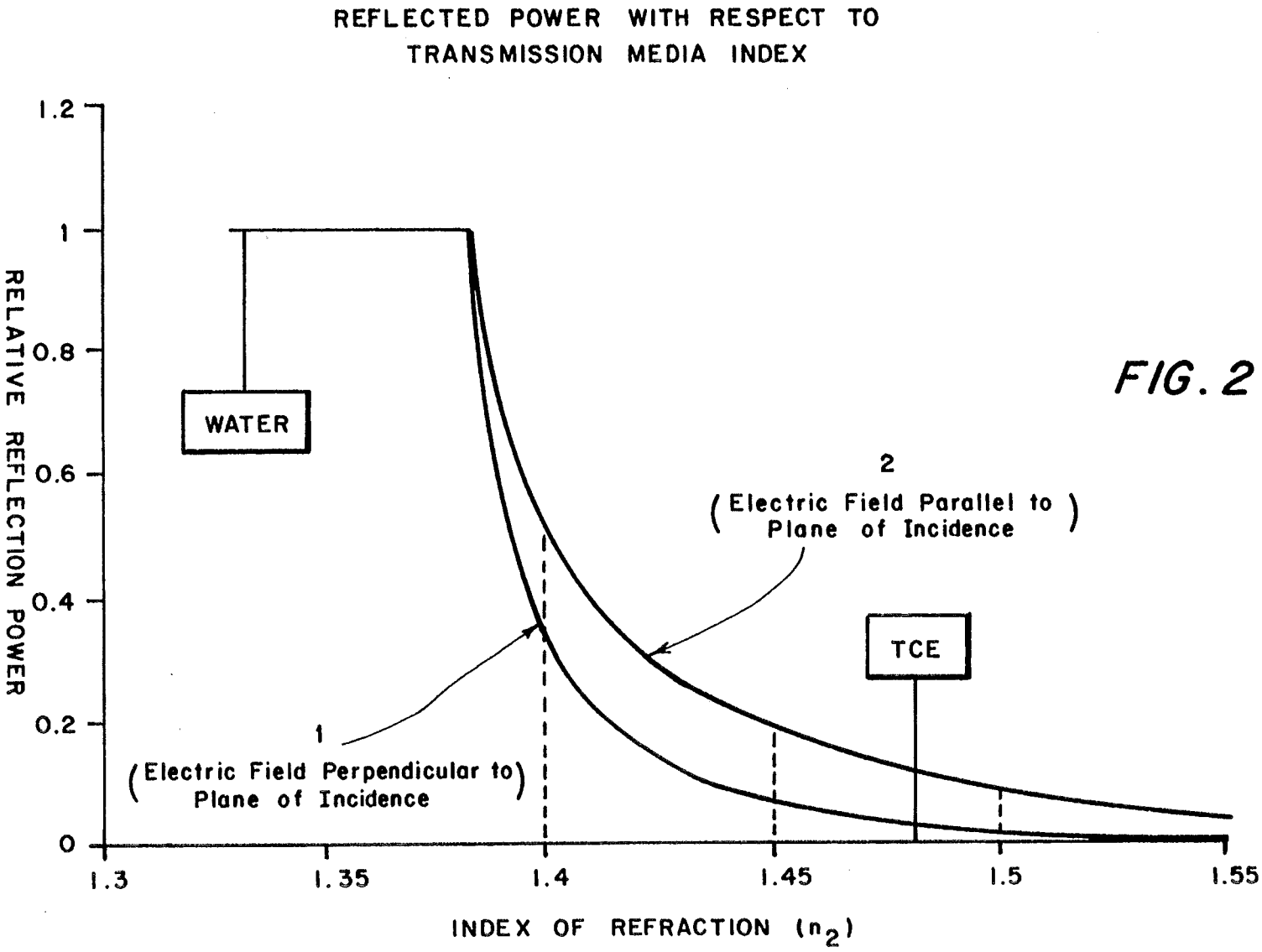
FIG. 2 is a diagram which illustrates the output of a refractive index-based sensor of each of FIGS. 1 and 3 of the present invention.

Referring now to FIG. 2, there is shown a graphic representation of the output of a refractive index-based sensor in accordance with the present invention. In FIG. 2, the vertical axis corresponds to the relative intensity of the reflected light, while the horizontal axis corresponds to the index of refraction $n_2$ of the second media. The relative reflected power over a series of refractive indices was calculated for a sapphire sensor ($n_1=1.76$) with a beam of light having an angle of incidence $\Theta_I$ equal to 52 degrees. Line 1 is a plot of the relative reflected power when the light is polarized such that the electric field is perpendicular to the plane of incidence. Line 2 is a plot of the relative reflected power when the light is polarized such that the electric field is parallel to the plane of incidence. Thus, FIG. 2 is representative of the output of photodetector 38 of FIG. 1 as a function of the refractive index $n_2$ of the material present at the face 12 of a sapphire sensor 10.

As is shown in FIG. 2, the relative reflected power for a material with a relatively low index of refraction $n_2$ (e.g. water, $n_2=1.33$; acetone, $n_2=1.36$) is approximately equal to 1. The reflected power remains high until the refractive index $n_2$ of the material in contact with face 12 of sensor 10 reaches approximately 1.39 at which point, as predicted by equation 1, the reflected power sharply decreases. As the refractive index $n_2$ increases, the relative power continues to decrease. For a material with relatively high refractive index $n_2$ (e.g. chloroform, $n_2=1.45$; TCE, $n_2=1.48$; benzene, $n_2=1.50$), only a small percentage of the original power is reflected.

The gradual decrease in the relative reflected power observed after the sharp initial decrease may be used to further distinguish between materials having slight differences in their respective refractive indices $n_2$. For example, referring to line 2, approximately 50% of the original power is reflected when the index of refraction $n_2$ is 1.4, while approximately 20% of the original power is reflected when $n_2$ is 1.45 and approximately 10% for $n_2$ equal 1.5. Thus, the sensor 10 can be calibrated such that chloroform ($n_2=1.45$) can be distinguished from benzene ($n_2=1.50$), while both benzene and chloroform can be distinguished form water or acetone.

Figure 3:
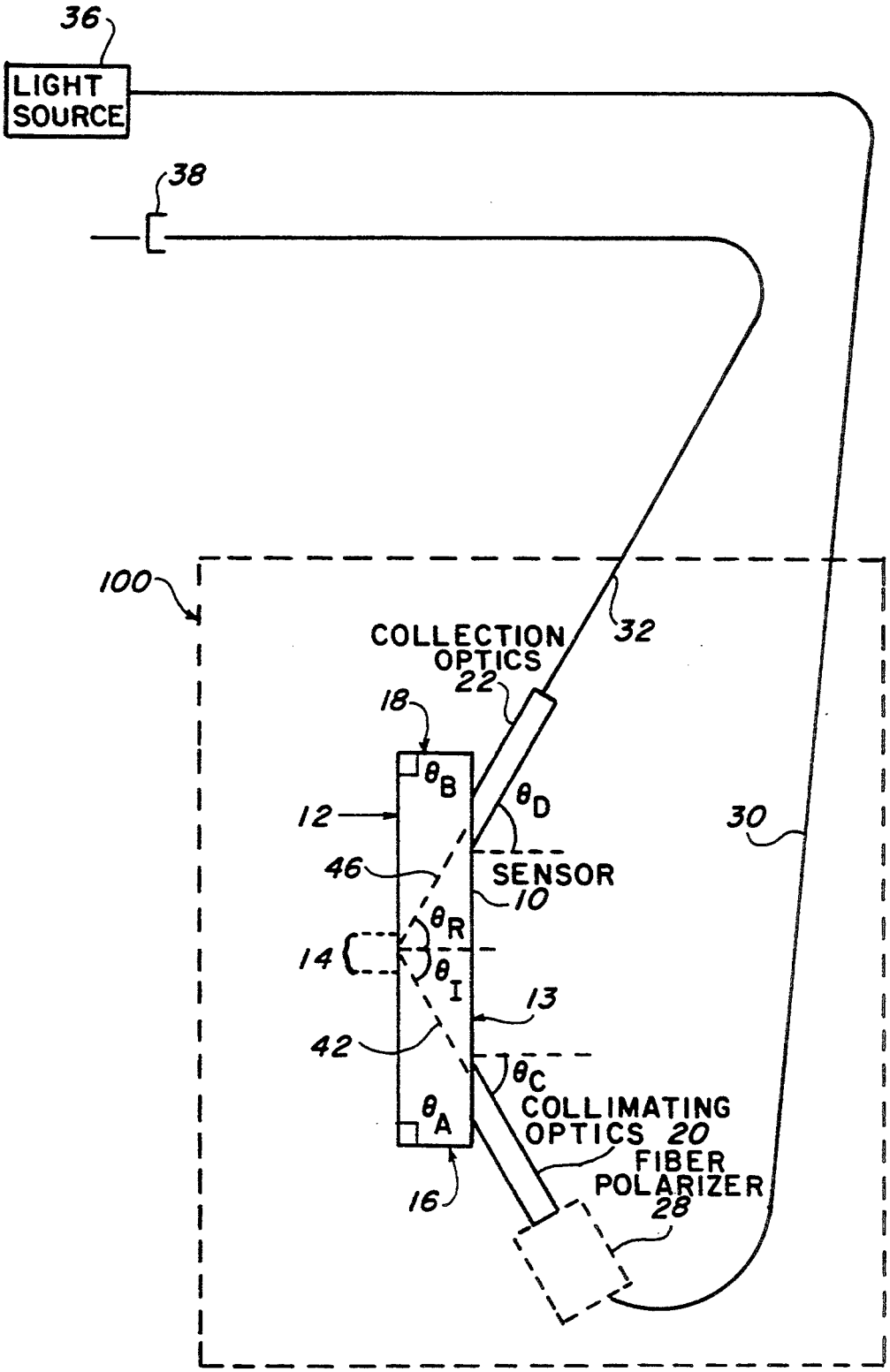
FIG. 3 is a diagram showing a second embodiment of the present invention.

Referring now to FIG. 3, there is shown a second embodiment of a refractive index-based sensor according to the present invention. In FIG. 3, light from source 36, such as a halogen lamp, an LED, or a laser, is transmitted through a length of optical fiber 30, through collimating optics 20 and into sensor 10. The light entering sensor 10 will be internally reflected so long as the angle of incidence (angle $\Theta_I$) is greater than or equal to the critical angle as determined by equation 1, discussed in reference to FIG. 1. This internally reflected light is then collected by collection optics 22 and coupled to fiber 32. The light coupled to fiber 32 is directed onto photodetector 38 which creates an electronic output proportional to the intensity of the light received.

The embodiment shown in FIG. 3 operates in the same manner as that described above in FIGS. 1 and 2. However, the manner in which collimating optics 20 and collection optics 22 are affixed to sensor 10 differs from the embodiment of FIG. 1. In FIG. 3, collimating optics 20 and collection optics 22 are mounted to surface 13 of sensor 10 as shown. Collimating optics 20 is affixed to surface 13 of sensor 10 at an angle $\Theta_C$. Angle $\Theta_C$ is related to the angle of incidence $\Theta_I$ by the following equation:

$$n_C\sin(\Theta_C)=n_1\sin(\Theta_I) \quad (2)$$

where $n_C$ is the index of refraction of collimating optics 20 and $n_1$ is the index of refraction of sensor 10. Collection optics 22 should be directly coupled to sensor 10 such that collection optics 22 and collimating optics 20 are diametrically opposed. It is preferred that collection optics 22 be affixed to surface 13 of sensor 10 such that angle $\Theta_D$ is equal to angle $\Theta_C$.

Figure 4:
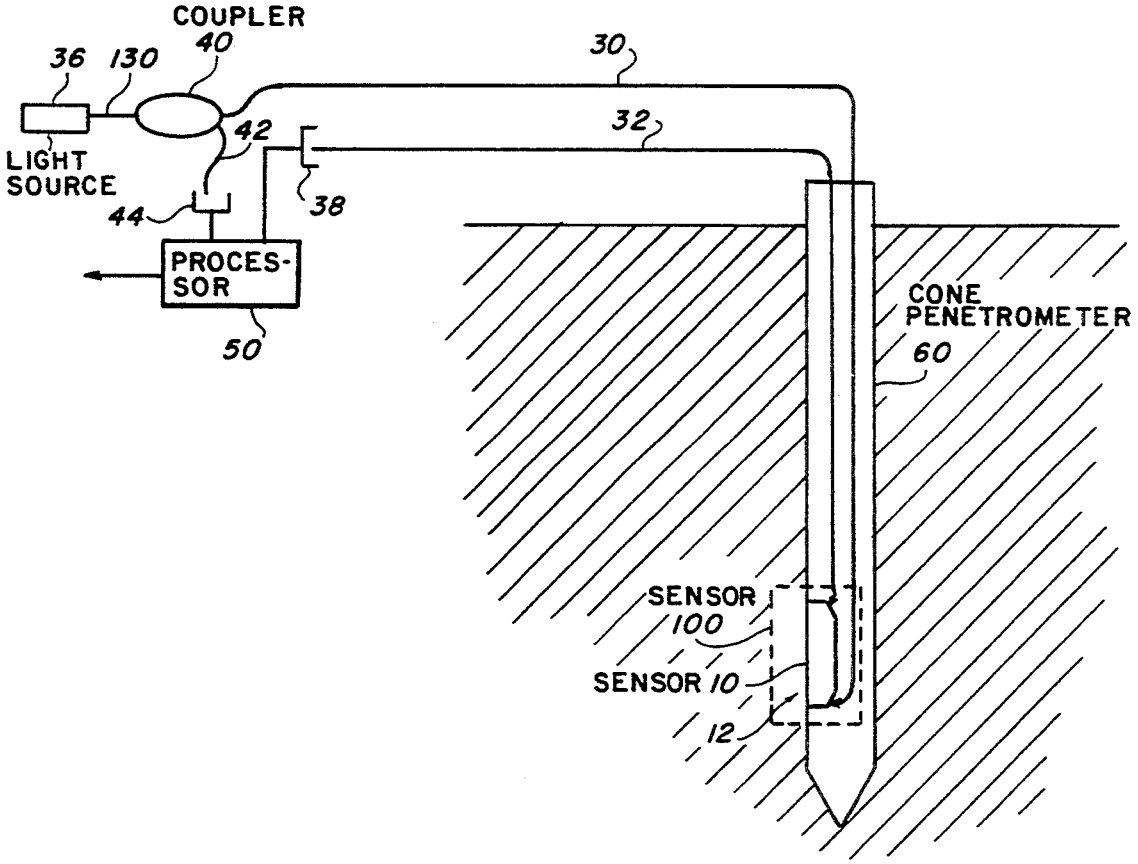
FIG. 4 is a schematic diagram showing a system incorporating the refractive index-based sensor of the present invention.

Referring to FIG. 4, a schematic diagram of a system incorporating the refractive index-based sensor of the present invention is shown. In FIG. 4, source 36 introduces an optical beam (not shown) into optical fiber 130. Coupler 40 directs the light carried by fiber 130 to fibers 42 and 30. Fiber 42 directs the light onto photodetector 44 which produces an output proportional to the amount of light received. Optical fiber 30 which directs the light to sensor 100 mounted in cone penetrometer 60. Preferred embodiments of sensor 100 (i.e. a refractive index-based sensor) are shown in FIGS. 1 and 3. Fiber 32 directs the light internally reflected within sensor 10 of sensor 100 onto photodetector 38. Photodetector 38 produces an output proportional to the amount of light received. The output of photodetectors 38 and 44 are directed to processor 50.

Processor 50 responds to the outputs of photodetectors 38 and 44 to produce an output indicating the type of material that is present at the face 12 of sensor 100. The output of photodetector 44 can be used as a reference signal to track variations in the output intensity of source 36. Thus, variations in the output of source 36 are not interpreted as variations in the amount of light reflected within sensor 10 of sensor 100. Processor 50 can embody numerous designs as those skilled in the art will readily recognize. For example, processor 50 can be coupled to a signal light or other appropriate indicator which would signal when the material present at face 12 of sensor 100 has a refractive index lower than or greater than a predetermined refractive index.

Cone penetrometer 60 is a hollow shaft containing an opening along the length of the shaft into which sensor 10 of sensor 100 is fitted. One end of cone penetrometer 60 tappers to a point, enabling the cone penetrometer to be driven into the soil. The other end of cone penetrometer 60 is open and is fabricated to accept additional lengths of hollow tubing. These lengths of tubing are likewise designed to accept successive sections of tubing. The entire length of cone penetrometer 60 remains hollow such that optical fibers 30 and 32 can be contained within the penetrometer out of contact with the soil and other material passing along the outside of the penetrometer. Thus, the fibers are protected from damage as the penetrometer is driven into the soil.

In operation, sensor 100 is designed to be responsive to a specific material and is then mounted in cone penetrometer 60. For example, sensor 100, similar to the sensor discussed in reference to FIG. 3 (sapphire sensor window, $\Theta_I=52$ degrees), could be mounted in a cone penetrometer 60 and used to detect liquid pools of TCE. Cone penetrometer 60 is then inserted into the ground and slowly driven into the soil by any of several conventional means such as by an hydraulic press. As cone penetrometer 60 is driven further into the soil, addition lengths of the penetrometer shaft are added. As the penetrometer is driven into the soil, sensor 10 of sensor 100 will slowly pass by material present in the soil such as water vapor and soil gases. Thus, sensor 100, and more particularly sensor 10, are self correcting. That is, as the sensor 100 is driven into the ground and sensor 10 passes different materials, any residue from previous materials is removed as sensor 10 passes the different materials. Sensor 100 will respond to these materials within the soil as described above in reference to FIGS. 1, 2, and 3. By monitoring the depth at which cone penetrometer 60 is driven into the soil, the system can be used to produce a certain output as a function of any particular liquid found at different depths.

The use of a sensor in which the angle of incidence is preset enabling the sensor to detect specific liquids has the advantage of allowing the sensor to use a hard, rugged material such as sapphire for the window. Alternatively, choosing a sensor 10 with a refractive index near that of the liquid may limit the sensor material to a soft glass which could easily be damaged by objects such as rocks which come into contact with the sensor 10.

While the embodiment of the present invention shown in FIG. 4 includes a single sensor 100 of the type described in FIGS. 1 and 3 within a cone penetrometer, it is also possible to combine two or more of the devices shown in FIGS. 1 and 3 within a single cone penetrometer to obtain more detailed information. By including two or more sensors within a single cone penetrometer, the system can be used to detect several specific liquids and unambiguously identify the liquid present at sensor 10 of the sensor 100.

The many features and advantages of the present invention are apparent from the detailed specification and thus it is intended by the appended claims to cover all such features and advantages of the invention which follow in the true spirit and scope thereof. Further, since numerous modifications and changes will readily occur to those skilled in the art, it is not desired to limit the invention to the exact construction and operation illustrated and described, and accordingly all suitable modifications and equivalence may be resorted to as falling within the scope of the invention.

What is claimed is:

1. An apparatus for detecting liquid materials, said apparatus comprising:

a light source;

a sensor selected to have a shape such that light directed into said sensor has a specific angle of incidence, said angle of incidence selected for detecting a plurality of liquids;

means for collimating light from said light source and directing said light into said sensor;

means for collecting light reflected within said sensor; and means for detecting said collected light.

2. The apparatus of claim 1 further including:

means for introducing said sensor into the ground.

3. The apparatus of claim 2 wherein said introducing means is a cone penetrometer, said apparatus further including:

means for polarizing light disposed between said light source and said collimating means.

4. The apparatus of claim 2 wherein:

said collimating means is a graded index lens and said collecting means is a graded index lens.

5. An apparatus for detecting liquid materials, said apparatus comprising:

a light source;

a sensor;

means for collimating light from said light source, said collimating means affixed to said sensor for directing said light into said sensor at a preselected angle;

means for collecting light reflected within said sensor; and means for detecting said collected light.

6. The apparatus of claim 5 further including:

means for introducing said sensor into the ground.

7. The apparatus of claim 6 wherein said introducing means is a cone penetrometer, said apparatus further including:

means disposed between said light source and said collimating means for polarizing light from said light source.

8. The apparatus of claim 6 wherein:

said collimating means is a graded index lens; and said collecting means is a graded index lens.

* * * * *